(12) United States Patent
Wright et al.

(10) Patent No.: US 7,272,920 B2
(45) Date of Patent: Sep. 25, 2007

(54) GRASS CATCHER FOR LAWN MOWER

(75) Inventors: William R. Wright, Clarksburg, MD (US); James D. Velke, Germantown, MD (US); Glenn T. Hubert, Montgomery Village, MD (US)

(73) Assignee: Wright Manufacturing, Inc., Frederick, MD (US)

( * ) Notice: Subject to any disclaimer, the term of this patent is extended or adjusted under 35 U.S.C. 154(b) by 0 days.

(21) Appl. No.: 10/769,988

(22) Filed: Feb. 3, 2004

(65) Prior Publication Data
US 2004/0200202 A1   Oct. 14, 2004

Related U.S. Application Data

(60) Provisional application No. 60/444,208, filed on Feb. 3, 2003.

(51) Int. Cl.
*A01D 43/06* (2006.01)
(52) U.S. Cl. ..................................... 56/202
(58) Field of Classification Search .......... 56/194–206, 56/320.1, 320.2, 5; D15/17
See application file for complete search history.

(56) References Cited

U.S. PATENT DOCUMENTS

| | | | | |
|---|---|---|---|---|
| 3,143,842 A | * | 8/1964 | Mattson et al. ............... | 56/202 |
| 3,423,917 A | * | 1/1969 | Leader ........................ | 56/202 |
| 3,517,493 A | * | 6/1970 | Kiteley ........................ | 56/194 |
| 3,583,137 A | * | 6/1971 | Lozen ......................... | 56/194 |
| 3,816,986 A | * | 6/1974 | Van Der Gaast ............. | 56/202 |
| 3,822,536 A | * | 7/1974 | Leader ........................ | 56/202 |
| 3,925,972 A | * | 12/1975 | Andersson ................. | 56/320.2 |
| 3,971,198 A | * | 7/1976 | Lane ........................... | 56/202 |
| 4,361,001 A | * | 11/1982 | Almond et al. ............. | 56/12.8 |
| 4,738,088 A | * | 4/1988 | Klever et al. ................ | 56/202 |
| 4,745,735 A | * | 5/1988 | Katayama .................... | 56/202 |
| 4,924,664 A | * | 5/1990 | Hicks et al. ................. | 56/202 |
| 4,974,403 A | * | 12/1990 | Fukui et al. ................. | 56/202 |
| 5,074,106 A | * | 12/1991 | Di Paolo .................... | 56/202 |
| 5,317,860 A | * | 6/1994 | Dunn ......................... | 56/12.8 |
| 5,984,031 A | | 11/1999 | Velke et al. | |
| 6,155,034 A | | 12/2000 | Velke et al. | |
| 6,438,931 B1 | | 8/2002 | Velke et al. | |
| 6,550,563 B2 | | 4/2003 | Velke et al. | |

FOREIGN PATENT DOCUMENTS

JP            04287613 A   * 10/1992

* cited by examiner

*Primary Examiner*—Thomas B. Will
*Assistant Examiner*—Alicia Torres
(74) *Attorney, Agent, or Firm*—Nixon & Vanderhye P.C.

(57) ABSTRACT

A grass catcher is provided for attachment to a lawn mower such as a commercial lawn mower. In certain example embodiments, the catcher includes at least one baffle for causing a venturi effect during grass cutting operation. The presence of such a baffle may allow for reduced grass clogging and/or improved grass packing in the catcher during mower operation in certain example instances.

12 Claims, 6 Drawing Sheets

GRASS CATCHER FOR LAWN MOWER

This application claims priority on U.S. Provisional Patent Application No. 60/444,208, filed Feb. 3, 2003, the entire disclosure of which is hereby incorporated herein by reference.

This application relates to a grass catcher for use in connection with a lawn mower such as a self-propelled lawn mower. In certain example embodiments, grass flow in the catcher is aided by a venturi effect.

BACKGROUND OF THE INVENTION

Grass catchers for lawn mowers are known in the art. For example, see U.S. Pat. Nos. 6,155,034, 5,984,031, 6,550,563 and 6,438,931, the disclosures of which are hereby incorporated herein by reference.

Unfortunately, the design of conventional known grass catchers is such that clogging is easily realized. Clogging (i.e., the build-up of grass in the catcher in an undesirable locations such as at the entrance of the catcher) is of course undesirable and leads to

BRIEF SUMMARY OF EXAMPLE EMBODIMENTS OF THE INVENTION

A grass catcher is provided for attachment to a lawn mower such as a commercial lawn mower (e.g., self-propelled zero radius turning mower). In certain example embodiments, the catcher includes at least one baffle for causing a venturi effect during grass cutting operation.

For example, a lower venturi baffle may cause incoming grass blown outwardly from the mower blade(s) to be directed slightly upwardly as it comes into the catcher and/or may cause the path of incoming grass to curve rearwardly toward the rear of the grass catcher. This baffle may, at its distal end, be spaced from the exterior of the catcher so that an air inlet opening may be defined between the baffle and the outer periphery of the catcher. This baffle may cause a venturi effect to be created in which air from outside the catcher is pulled or sucked into the catcher in a vacuum manner. In certain example embodiments, a lower venturi baffle which directs the incoming grass at least partially upwardly, may create a venturi phenomenon that draws fresh air into the catcher through an opening(s). This incoming fresh air, incoming through opening(s) in the catcher, flows beneath or to the side of the baffle into the catcher interior. This incoming air provides an air cushion under at least some of the grass being blown into the catcher from the mower blade(s) thereby preventing or reducing the amount of grass which sticks to the catcher side(s) or wall(s) prematurely before reaching the rear of the catcher or the wall of grass in the catcher. Thus, this venturi effect aids grass flow in the catcher and helps reduce grass clogging of the catcher by giving lift to the incoming grass. This venturi effect also increases the total air in the catcher interior, with additional air in the catcher infiltrating and aerating the grass in the catcher so as to make the grass less dense. This higher air-to-grass ratio in the catcher helps prevent/reduce clogging so that incoming grass flows to a rearward point in the catcher as opposed to sticking to a wall (bottom or side) of the catcher before reaching the back of the catcher.

Other types of venturi baffles (e.g., side venturi baffle(s)) may be provided for the catcher in other example embodiments of this invention, either with or without the lower venturi baffle discussed above.

In certain example embodiments of this invention, there is provided a grass catcher for a lawn mower, the grass catcher comprising: a frame; and at least one venturi baffle supported by at least the frame of the grass catcher, the at least one venturi baffle causing a venturi effect to be created in which air from outside the catcher is pulled or sucked into the catcher in a vacuum manner during operation of the mower when grass from blade(s) of the mower is blown into the catcher.

In other example embodiments of this invention, there is provided a grass catcher for a lawn mower, the grass catcher comprising at least one baffle for causing the catcher to draw in at least 10% more air than the mower exhausts into the catcher.

BRIEF DESCRIPTION OF THE DRAWINGS

FIG. 8 is a front view of the catcher of FIGS. 3-7, illustrating the catcher hinging on the deck if the outer edge of the catcher is lifted or rides up on terrain such as a hill, curb or the like.

DETAILED DESCRIPTION OF EXAMPLE EMBODIMENTS OF THE INVENTION

Referring now to the figures in which like reference numerals indicate like parts throughout the several views.

This application relates to a grass catcher for use in connection with a lawn mower such as a self-propelled lawn mower. In certain example embodiments, grass flow in the catcher is aided by a venturi effect. Any of the grass catchers discussed herein may be attached to any of the lawn mowers disclosed in any of U.S. Pat. Nos. 6,155,034, 5,984,031, 6,550,563 and/or 6,438,931 (or to any other suitable mower), the disclosures of which are hereby incorporated herein by reference.

Certain example embodiments of this invention relate to a grass catcher for attachment to a commercial lawn mower, wherein the grass catcher is designed so as to improve air flow thereby allowing the catcher to realize less clogging and thus hold more grass on a consistent basis.

Figures 1, 2:
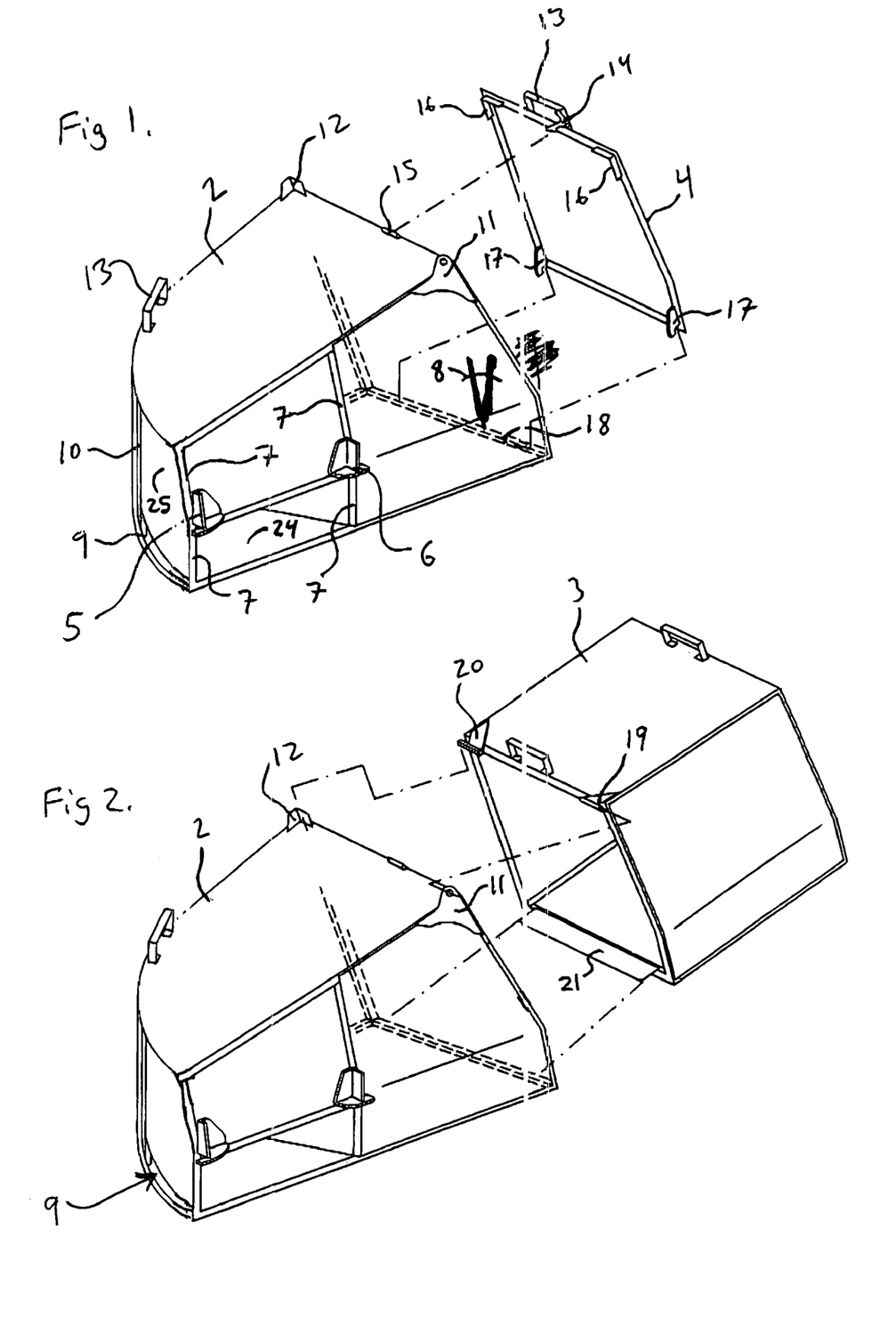
FIG. 1 is a perspective view of a grass catcher according to an example embodiment of this invention.
FIG. 2 is a perspective view of a grass catcher according to an example embodiment of this invention, with an optional rear catcher extension.

FIG. 1 illustrates a grass catcher 2 according to an example embodiment of this invention. In FIG. 1, the catcher 2 includes an optional rear door 4 (used with or without an extension to be discussed below), front hanger pin or member 5, rear hanger pin or member 6 (elements 5, 6 are used to couple the catcher to the mower), frame tubes or supports 7 coupled to areas where the members 5 and/or 6 are provided that are used to provide a frame of the catcher, front lower venturi opening 9, vertical side venturi opening 10, metal plate 11 with an aperture defined therein for a round extension hanger pin, catch 12 for a square extension hanger pin, handles 13, door latch 14 attached proximate door handle 13 for allowing the door 4 to be attached to a rear end of the catcher 2, pin catch or latch 15 for operative coupling with door latch 14, alignment angle iron 16 provided on the door 4 to fit within a periphery of the catcher frame to prevent the door 4 from moving upwardly or side-to-side when latched, bottom door catch hook(s) 17 attached to the door 4 for operative coupling with a bottom frame member 18 at the rear of the catcher to allow the door and catcher to be coupled to one another, lower venturi baffle 24, and side venturi baffle 25.

In other example embodiments, the catcher may have an extension provided at the rear thereof to make the catcher longer and thus allow it to hold more grass during operation. In this respect, FIG. 2 illustrates a catcher that is similar to the FIG. 1 catcher except that the catcher includes an optional catcher extension 3. The catcher extension 3 in FIG. 2 includes extension hanger pin 19 to be inserted into an aperture in plate 11, hanger 20 to hook over catch 12, and bottom extension baffle 21 to aid in alignment of the extension and catcher and to help keep grass from falling out of the catcher during the first several inches of extension hinging. The following descriptions of a catcher may apply to the FIG. 1 embodiment, the FIG. 2 embodiment, or to other embodiments of this invention.

Figure 3:
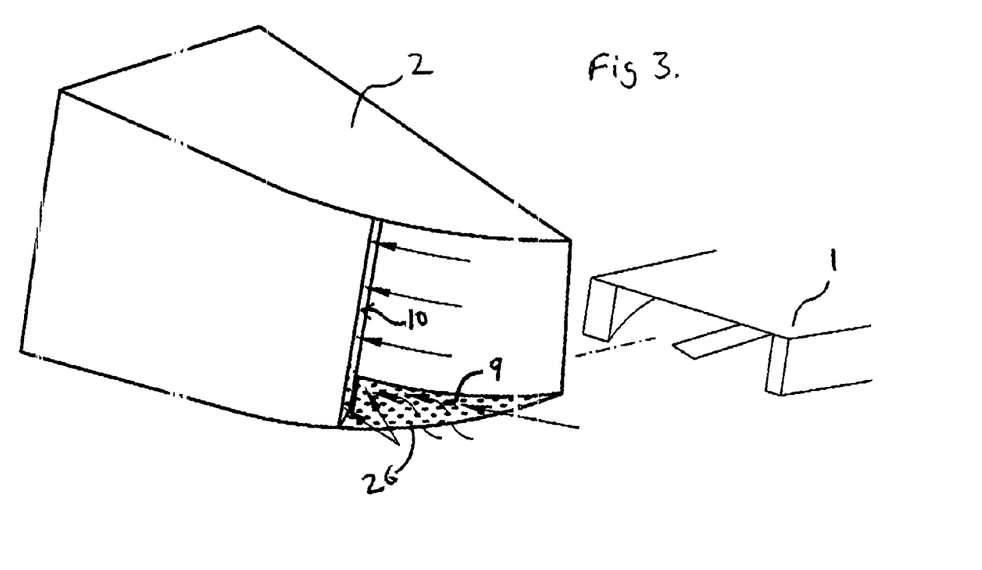
FIG. 3 is a perspective view of a grass catcher according to an example embodiment of this invention, and a portion of a mower deck of the mower to which the catcher is to be attached (arrows show that air used for the venturi system can enter the catcher through the bottom perforated steel portion, through the front lower opening, and/or through the side vertical opening).
Figure 4:
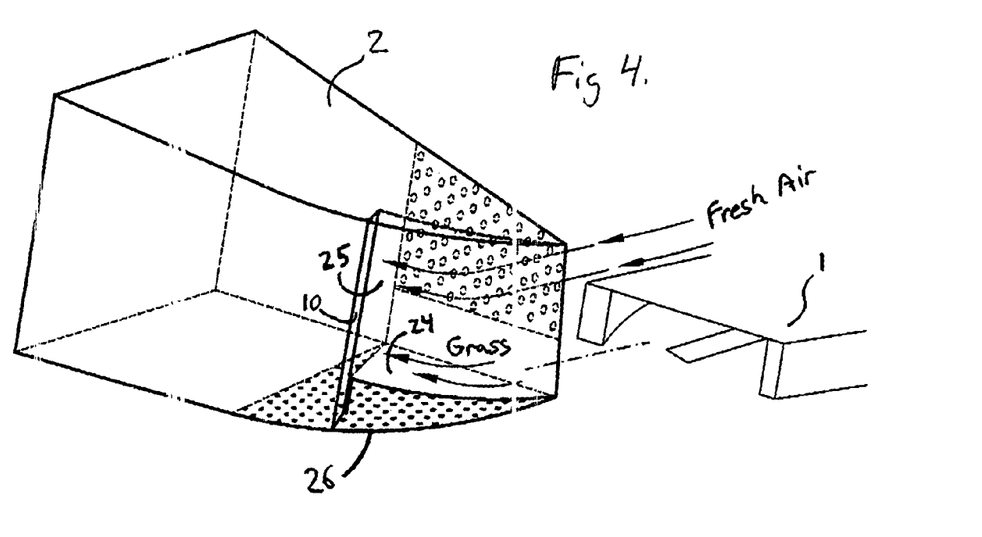
FIG. 4 is a perspective view of the catcher of FIG. 3, illustrating how grass enters the catcher and ramps up the inner bottom baffle which allows the grass to be carried by the flow of air coming through from underneath the baffle (also illustrating how air enters through the perforated portion that may be made of steel of the like and which is above the catcher opening to increase velocity of the grass flow).
Figure 5:
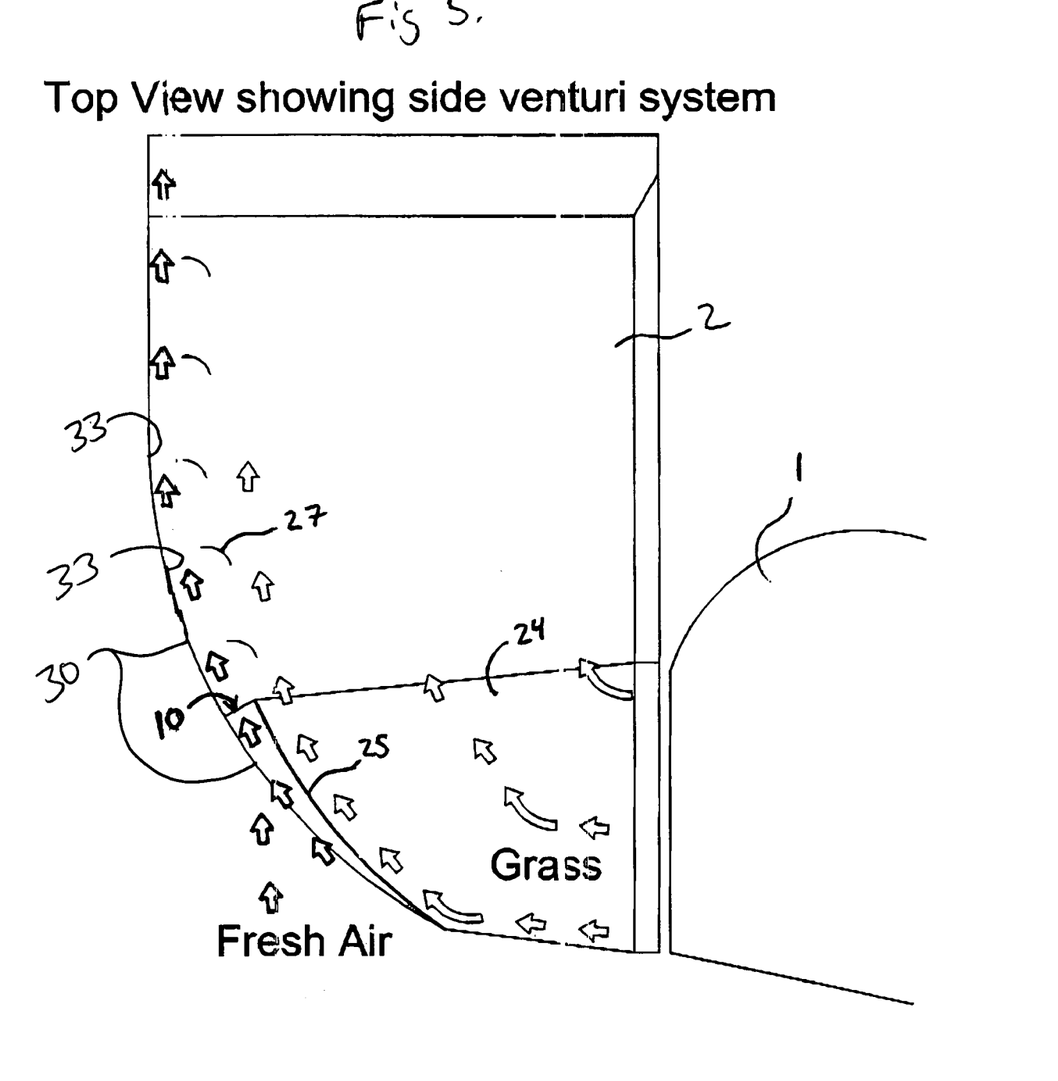
FIG. 5 is a top schematic view of the catcher of FIGS. 3-4, illustrating an example of how the venturi system works.
Figure 6:
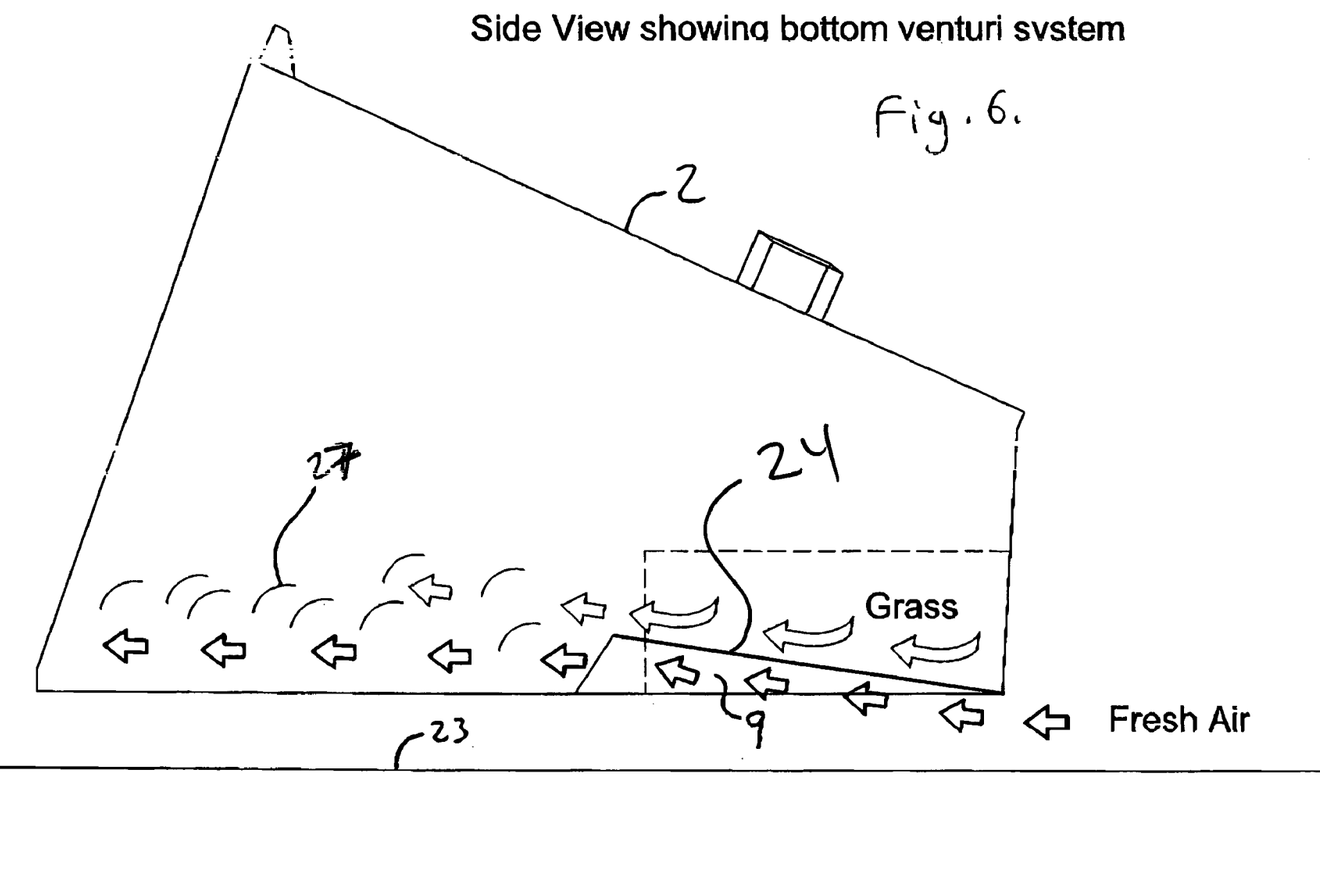
FIG. 6 is a side schematic view of the catcher of FIGS. 3-5, illustrating an example of how the venturi system works.

FIG. 3 is a perspective view of a grass catcher 2 according to an example embodiment of this invention (e.g., the catcher of FIG. 1 and/or 2), and a portion of a mower deck 1 of the mower to which the catcher is to be attached (arrows show that air used for the venturi system can enter the catcher through the bottom perforated steel portion 26, through the front lower opening, and/or through the side vertical opening). FIG. 4 is a perspective view of the catcher 2 of FIG. 3, illustrating how grass enters the catcher and ramps up the inner bottom baffle 24 which allows the grass to be carried by the flow of air coming through from underneath the baffle (also illustrating how air enters through the perforated portion that may be made of steel of the like and which is above the catcher opening to increase velocity of the grass flow). FIG. 5 is a top view of the catcher of FIGS. 1-4, illustrating that as air passes the end of the inner side baffle 25 it creates a vacuum effect on the grass side of the baffle which increases velocity of the grass as it is carried by the entering air toward the rear of the catcher. FIG. 6 is a side view diagram of the catcher of FIGS. 1-5, illustrating that as air passes the end of the inner bottom baffle 24 it also creates a vacuum effect on the grass side of the baffle 24 which in turn increases velocity of the grass as it is carried by the entering air toward the rear of the catcher.

Referring to the accompanying drawings (e.g., see FIGS. 3-6), lower venturi baffle 24 is slanted slightly upwardly relative to the bottom 26 of the catcher and/or relative to flat ground on which the mower is being operated. In certain example embodiments, the bottom 26 of the catcher may be made of perforated steel sheet or the like. As the lower venturi baffle 24 slants upwardly, at least parts of the baffle 24 are located at an elevation above the bottom of the catcher. Thus, lower venturi baffle 24 causes incoming grass blown outwardly from the mower blade(s) to be directed slightly upwardly as it comes into the catcher 2. Moreover, the vertically extending baffle 25 causes the path of incoming grass to curve rearwardly toward the rear of the grass catcher. Baffle 25, at its distal end, is spaced from the exterior of the catcher so that air inlet opening 10 is defined between baffle 25 and the outer periphery of the catcher. Baffles 24 and 25 both enable respective venturi effects to be created in which air from outside the catcher is pulled or sucked into the catcher in a vacuum manner. Catchers according to certain embodiments of this invention may include both baffles 24 and 25, while catchers according to other embodiments of this invention may include only one of the two baffles 24, 25. Other baffles may also be provided.

Lower venturi baffle 24 which directs the incoming grass upwardly, creates a venturi phenomenon that draws fresh air into the catcher 2 through opening 9 as shown in FIG. 6. This incoming fresh air, incoming through opening 9, flows beneath baffle 24 into the catcher interior. This incoming air provides an air cushion under at least some of the grass being blown into the catcher from the mower blade(s) thereby preventing or reducing the amount of grass which sticks to the catcher side(s) or wall(s) prematurely before reaching the rear of the catcher or the wall of grass in the catcher. Thus, this venturi effect aids grass flow in the catcher and helps reduce grass clogging of the catcher by giving lift to the incoming grass. This venturi effect also increases the total air in the catcher interior, with additional air in the catcher infiltrating and aerating the grass in the catcher so as to make the grass less dense. This higher air-to-grass ratio in the catcher helps prevent/reduce clogging so that incoming grass flows to a rearward point in the catcher as opposed to sticking to a wall (bottom or side) of the catcher before reaching the back of the catcher.

In a similar manner, vertically extending side venturi baffle 25 directs the incoming grass rearwardly toward the rear of the catcher (e.g., see FIG. 5). Since, as the baffle 25 curves rearwardly moving toward the rear of the catcher, and the baffle 25 is located interior of the outer periphery 30 of the catcher, the baffle 25 creates a venturi phenomenon that draws fresh air into the catcher through opening 10 as shown in FIGS. 3-5. This incoming fresh air, incoming through opening 10 (openings 9, 10 herein may be covered with screen, or other metal material having apertures therein, or may be completely free of obstruction in other embodiments), flows behind baffle 25 into the catcher interior. This incoming air provides an air cushion at the back of at least some of the grass being blown into the catcher thereby preventing or reducing the amount of grass which sticks to the catcher side(s) or wall(s) 33 prematurely before reaching the rear of the catcher or the wall of grass in the catcher.

Thus, this venturi effect aids grass flow in the catcher a helps reduce grass clogging in the catcher.

This venturi effect also increases the total air in the catcher interior, with additional air in the catcher infiltrating and aerating the grass in the catcher so as to make the grass less dense and easier to store in the catcher. This higher air-to-grass ratio in the catcher helps prevent/reduce clogging so that incoming grass flows to a rearward point in the catcher as opposed to sticking to a wall of the catcher before reaching the back of the catcher.

In certain example embodiments, the aforesaid venturi baffles 24, 25 allow the catcher to draw in at least 10% more air than the mower exhausts into the catcher (more preferably at least 20% more, and even more preferably at least 30% more), thereby powerfully aerating the grass flow with lower and/or outer laminar flows of air for lift and/or lubrication to prevent clogging. This results in much more tightly packed grass in the catcher, thereby enabling the catcher to hold more grass on a consistent basis.

Openings 9 and 10 are completely open, and need not be covered by perforated steel in certain example embodiments of this invention. However, openings 9, 10 could be covered with perforated steel or screen in certain other embodiments of this invention.

Baffle 25 in certain example embodiments extends past opening 10 so as to not let grass flow out of opening 10 during normal mower operation. Baffles 24, 25 may be made of or comprise steel or other suitable material in certain example embodiments. The bottom 26 of the catcher is typically covered with perforated steel, and air flows through the openings defined therein in order to add to the volume of air entering the catcher thereby aiding grass flow toward the rear of the catcher. Flat perforated steel may be used on the catcher bottom 26.

With respect to baffle(s) 24 and/or 25, louver(s) (not shown) (similar to venetian blinds open half-way) may be defined in the baffle(s) 24 and/or 25. Grass can flow across the louvers of the baffle(s) in a manner similar to described herein; and in addition air can flow through apertures defined in the baffle(s) due to the louver(s) thereby adding to air volume in the catcher and improving grass flow. The incoming air comes through openings behind the louver(s) through which grass is not directed, and aids in helping the grass reach the rear of the catcher.

In certain example embodiments of this invention, catchers may have a curved bottom surface below at least the grass inlet so that the front of the catcher can be higher so as to fit higher front mower deck edges in certain example instances.

Figure 7:
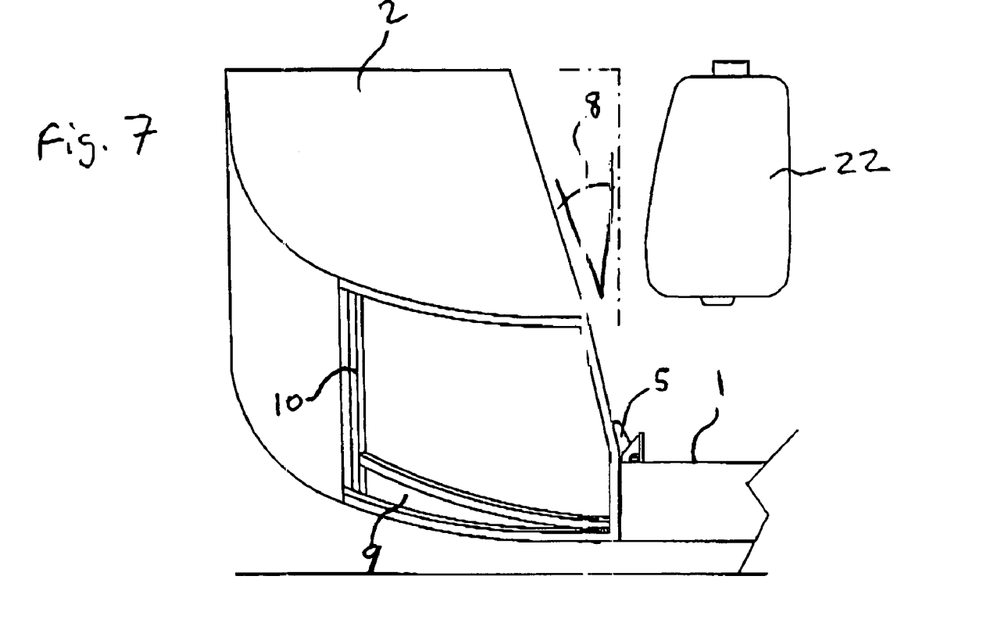
FIG. 7 is a front view of the catcher of FIGS. 3-6, along with the mower deck and fuel tank of the lawn mower to which the catcher is to be attached.
Figure 8:
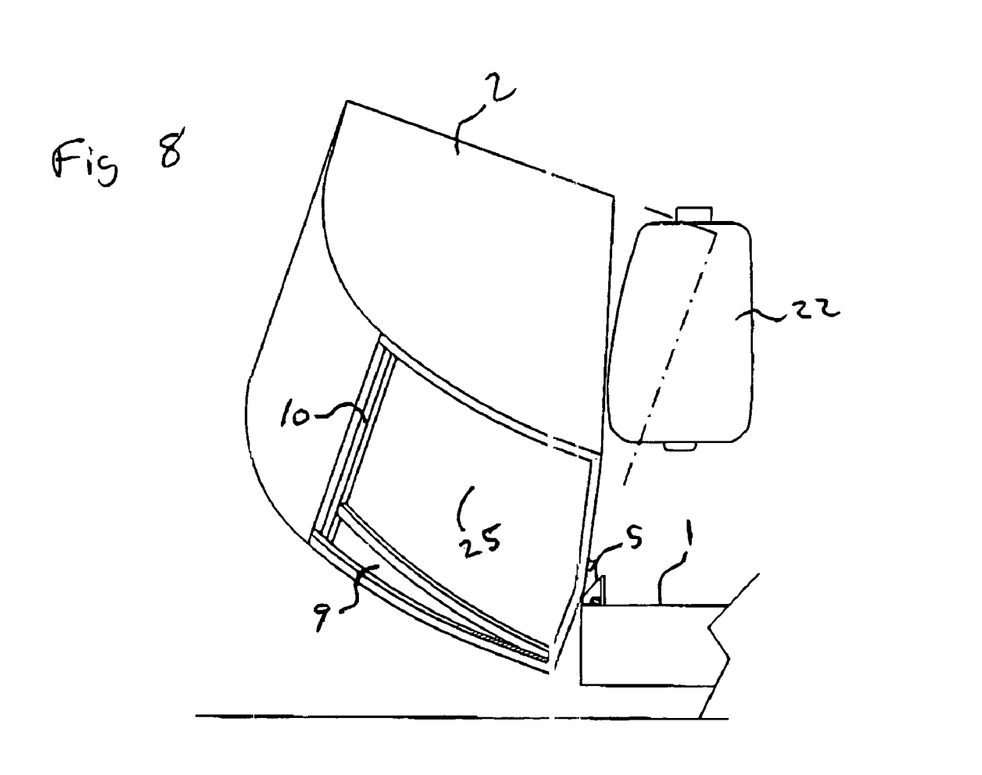

Referring to FIGS. 7-8 for example, in certain example embodiments of this invention, a catcher may include a bend therein (e.g., see angle 8 at a top and/or side portion of the catcher 2) to help prevent the catcher 2 from hitting the gas tank 22 of the mower or any other sensitive part of the mower when going over bumps and/or the like. The catcher is thus permitted to float when hitting obstacles.

Figure 9:
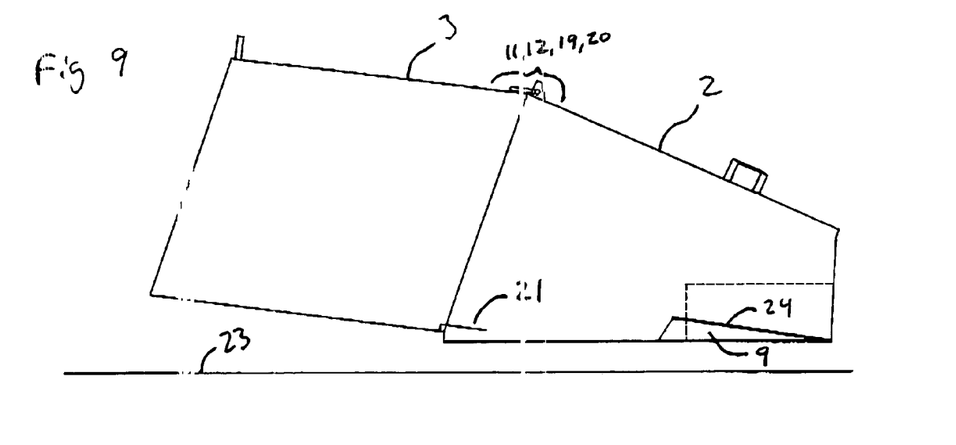
FIG. 9 is a side view illustrating a catcher according to an example embodiment of this invention, wherein an optional catcher extension lower baffle is provided at least partially inside the catcher.
Figure 10:
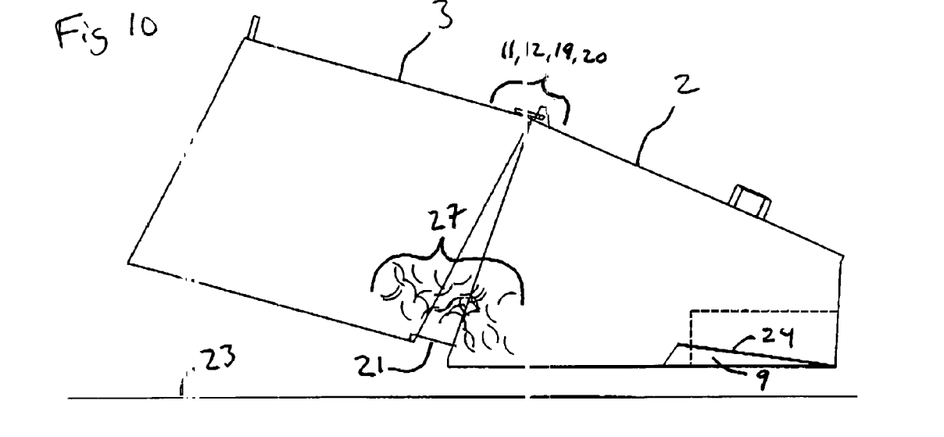
FIG. 10 is a side view illustrating the catcher of FIG. 9 when the extension is lifted relative to the main body of the catcher.
Figure 11:
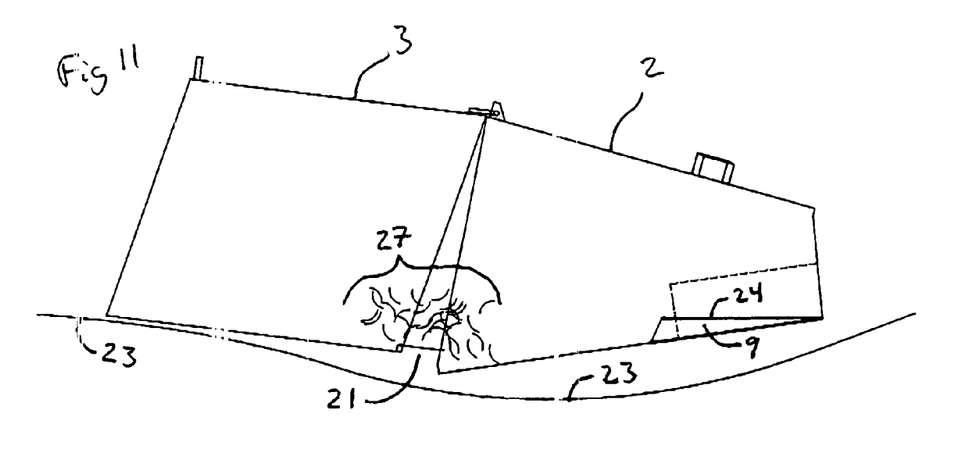
FIG. 11 is a side view illustrating the catcher of FIGS. 9-10, illustrating how the lower extension baffle may help keep grass from falling to the ground if the extension were to be bumped by the ground or the like during operation.

FIGS. 9-11 illustrates how catcher extension 3 (applicable to the FIG. 2 embodiment) hinges with respect to main catcher 2 in certain example embodiments of this invention. Extension 3 hinges in a manner so as to allow bottoming out of the back end of the extension without causing the front catcher 2 to come off the mower or dig into the ground (e.g., see FIG. 11); and grass is able to stay in the catcher when this happens due to the presence of baffle 21 as shown in FIGS. 10-11. When one takes the extension 3 off, it is to be lifted as shown in FIG. 10 and lift pin 20 out of pocket 12 and baffle 21 moves to the side and misses the frame catcher. This helps keep the extension 3 from coming off inadvertently, since it must be pivoted upward first before the hinge mechanism can be unhooked to remove 20 from 12. Again, baffle(s) 21 keeps much of grass in during this procedure.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A grass catcher for a lawn mower, the grass catcher comprising:
   a frame;
   at least first and second venturi baffles supported by at least the frame of the grass catcher, the first and second venturi baffles each causing a venturi effect to be created in which air from outside the catcher is pulled or sucked into the catcher via a fresh air path in a vacuum manner during operation of the mower when grass from at least one blade of the mower is blown into the catcher via a grass-blown path, wherein the grass-blown path is different than the fresh air paths for the first and second venturi baffles; and
   wherein the first venturi baffle angles upwardly from a bottom of the grass catcher and causes grass coming into the catcher via the grass-blown path to move upwardly, and the second venturi baffle angles inwardly from a sidewall of the grass catcher and causes grass coming into the catcher to curve laterally so that the first and second venturi baffles cause incoming grass to move in different directions.

2. The grass catcher of claim 1, wherein the frame of the grass catcher comprises steel tubing.

3. The grass catcher of claim 1, wherein the venturi baffles cause the catcher to draw in at least 10% more air than the mower exhausts into the catcher during at least some grass cutting operations.

4. The grass catcher of claim 3, wherein the venturi baffles cause the catcher to draw in at least 20% more air than the mower exhausts into the catcher during at least some grass cutting operations.

5. The grass catcher of claim 1, wherein the venturi baffles cause the catcher to draw in at least 30% more air than the mower exhausts into the catcher during at least some grass cutting operations.

6. The grass catcher of claim 1, further comprising a rear extension hingedly connected to a rear portion of a main body of the catcher.

7. The grass catcher of claim 1, wherein the grass catcher comprises means for connecting the grass catcher to a self-propelled walk-behind lawn mower.

8. The grass catcher of claim 1, wherein the grass catcher is attachable to a self propelled walk-behind lawn mower.

9. A grass catcher for a lawn mower, the grass catcher comprising:
   at least first and second venturi baffles for causing the catcher to draw in at least 10% more air than the mower exhausts into the catcher via a grass-blown path, and
   wherein the first and second venturi baffles respectively cause incoming grass to move in different directions, the first venturi baffle angling upwardly from a bottom of the catcher and the second venturi baffle angling inwardly from a lateral side of the catcher furthest from the mower.

10. The grass catcher of claim 9, wherein the venturi baffles cause the catcher to draw in at least 20% more air than the mower exhausts into the catcher during at least some grass cutting operations.

11. The grass catcher of claim 9, wherein the venturi baffles cause the catcher to draw in at least 30% more air than the mower exhausts into the catcher during at least some grass cutting operations.

12. The grass catcher of claim 9, wherein the grass catcher comprises means for connecting the grass catcher to a self-propelled walk-behind lawn mower.

* * * * *